United States Patent [19]

Weber et al.

[11] Patent Number: 4,971,698

[45] Date of Patent: Nov. 20, 1990

[54] PROCESS FOR WASTEWATER PURIFICATION

[75] Inventors: Alfred Weber; Uwe Klages; Christoph Donner, all of Berlin, Fed. Rep. of Germany

[73] Assignee: Schering Aktiengesellschaft, Berlin and Bergkamen, Fed. Rep. of Germany

[21] Appl. No.: 304,432

[22] Filed: Jan. 6, 1989

[22] PCT Filed: May 6, 1988

[86] PCT No.: DE88/00281

§ 371 Date: Jan. 6, 1989

§ 102(e) Date: Jan. 6, 1989

[87] PCT Pub. No.: WO88/08825

PCT Pub. Date: Nov. 17, 1988

[30] Foreign Application Priority Data

May 7, 1987 [DE] Fed. Rep. of Germany ....... 3715867

[51] Int. Cl.$^5$ ................................................. C02F 3/10
[52] U.S. Cl. ...................................... 210/615; 210/908
[58] Field of Search ........ 210/606, 610, 611, 615–617, 210/908

[56] References Cited

U.S. PATENT DOCUMENTS

| | | | |
|---|---|---|---|
| 4,493,895 | 1/1985 | Colaruotolo et al. | 210/611 X |
| 4,713,343 | 12/1987 | Wilson, Jr. et al. | 210/611 X |
| 4,756,831 | 7/1988 | Menzel et al. | 210/611 X |
| 4,804,629 | 2/1989 | Roy | 210/611 X |

*Primary Examiner*—Tom Wyse
*Attorney, Agent, or Firm*—Millen, White & Zelano

[57] ABSTRACT

A process is disclosed for the purification of wastewaters containing biodegradable aliphatic compounds which is characterized in that these compounds are brought into contact with microorganisms capable of biodegradation immobilized by embedment in a gel-type organic polymer that does not denature the microorganisms.

3 Claims, No Drawings

PROCESS FOR WASTEWATER PURIFICATION

The invention relates to a process for the purification of wastewaters (including industrial effluents) which contain biodegradable materials.

Such processes have been known for a long time. Thus, for example, mention is made in "General Subjects Index" of the Chemical Abstracts, under the code word "Wastewater Treatment", inter alia, of the biodegradation of aliphatic alcohols, alkyl phosphates, ketones, hydrocarbons and amines, ammonium compounds, amides, chlorinated hydrocarbons, cyanides, heterocycles, carbohydrates, thiocyanates, dyes, surfactants, herbicides, pesticides, etc.

These conventional methods have the drawback that they can be performed successfully only if they are constantly monitored and maintained by experts. As a consequence, the wastewaters of varying origins—and therefore also with various biodegradable materials—are collected in central wastewater treatment plants and processed therein.

The present invention is based on the object of developing a process for the purification of wastewaters containing biodegradable materials, which process can be performed in an economical fashion decentralized by the individual producer of the wastewater and/or at the origination site of the wastewater.

This object has been attained by making a method available which is characterized in that the wastewaters are brought into contact with microorganisms capable of biodegradation, these microorganisms being immobilized by embedment in a gel-type organic polymer that does not denature the microorganisms.

In spite of the considerable expenditure accompanying the immobilization of the microorganisms by embedment in a polymer that does not denature the microorganisms, the process of this invention normally is surprisingly very much less expensive for the purification of wastewaters containing defined biodegradable, aliphatic compounds than the prior-art methods. This is so because, inter alia, of the following reasons that seem obvious in hindsight:

Substantially lesser quantities of water need to be purified when conducting the purification in a decentralized fashion at the wastewater producer's plant. This is not only more economical but also more effective, inasmuch as the impurities are known at the origination site and are present in concentrated form, than in central wastewater treatment installations.

The process according to this invention can be readily standardized and reproduced. The immobilized products required for this purpose can be commercially manufactured and can be delivered, equipped with appropriate directions, to the individual users who then can perform the process without the requirement of an expensive control and supervision by experts.

The process of this invention permits the use of those microorganisms which are especially capable of biodegrading the respectively formed wastewater. This provides the advantage that only relatively brief reaction times are necessary for performing the process of this invention.

As compared with purely chemical wastewater treatment plants, the biological plants have the advantage that they are more economical, require less energy, and have less pollutants in the wastewater.

The type of microorganism required for conducting the process of this invention is, of course, dependent on the biodegradable compounds polluting the wastewater to be purified. These microorganisms can be conventionally isolated from the mixed cultures of central wastewater treatment plants wherein such degradation is performed. On the other hand, however, many of these microorganisms are also already deposited in public culture collections and therefore freely available to persons expert in this field of art.

Immobilized products of mixed cultures of microorganisms can be utilized for the purification of wastewaters containing several biodegradable compounds. However, it is likewise possible, on the other hand, to prepare in each case immobilized products of the individual microorganism species and mix same prior to conducting the process of this invention.

Immobilization of the microorganisms by embedment in a polymer that does not denature the microorganisms takes place according to methods well known to those skilled in the art. (I. Chibata, Immobilized Enzymes; Research and Development; John Wiley and Sons, New York etc. 1978; Methods in Enzymology, 44 [19..]; Klaus Mosbach, Immobilized Cells and Arghanelles, Academic Press, New York, 1976, vols. 1 and 2; Bo Matthiasson, Immobilized Cells and Organelles, CRC Press Inc., Boca Raton, Fla., vols. 1 and 2.)

Suitable immobilized products are, for example:

Immobilized Microorganism Products on Alginate Basis

These can be produced by suspending the microorganisms in an aqueous prepolymer solution containing 0.5–5% by weight of sodium alginate, and introducing this suspension at a temperature of 5°–40° C. under agitation into a 0.01-to 0.4-molar aqueous solution of an aluminum salt or preferably a calcium salt (e.g. calcium chloride).

Immobilized Microorganism Products on Carrageenan Basis

These can be prepared, for example, by suspending the microorganisms in a 0.1–5.0 percent by weight aqueous carrageenan solution, heated to 25°–50° C., allowing the solution to cool until it becomes gel-like, mechanically comminuting the gel, and then hardening same in a 0.2 to 2.0 percent by weight aqueous solution of a potassium salt (e.g. potassium chloride).

Immobilized Microorganism Products on Chitosan Basis

These can be produced, for example, by suspending the microorganisms in a 0.5–13% by weight, protonated (adjusted to pH 4.5–5.5) chitosan solution heated to 20°–40° C., and adding thereto dropwise a counterion solution of, for example, potassium hexacyanoferrate(II) (with a concentration of 0.01–1 mol/liter).

Immobilized microorganism products based on acrylamide—and/or methacrylamide—can be prepared, for example, according to the method described in DE-A 2,252,888.

For increasing mechanical stability and density of the immobilized products, inorganic or organic carrier materials can be additionally combined with the suspensions prior to polymerization. Suitable carrier materials are, for example, silica gel, kieselguhr, activated carbon, or cellulose. A suitable method for producing such immobilized materials is, for example, the following: The microorganism biomass is suspended in an aqueous mixture of 0.5-5 percent by weight of sodium alginate, carrageenan, etc., and 0.5-35 percent by weight of gel-like silicic acid (produced from sodium silicate and acids and subsequently demineralized, or obtained commercially), and the mixture is dropped into a solution of, for example, 1-10% calcium chloride, potassium chloride, etc.

The optimum ratio of microorganism biomass to the quantity of gel-binding agent is, of course, dependent on the type of components employed and must be determined in the individual case by preliminary tests, as they are familiar to those skilled in the art.

The devices usable for performing the process of this invention can be, for example, agitator-equipped tanks that can optionally be heated to 10°-35° C. and can be aerated; in these tanks, wastewater is brought into contact with the immobilized product under agitation and aeration until the organic compounds have been degraded. After purification has taken place, the wastewater is filtered or decanted, and the tank refilled with wastewater.

On the other hand, the process can also be performed, for example, continuously by conducting the water through an optionally heatable and aeratable column or a prefabricated cartridge containing the immobilized product.

It is obvious to one skilled in the art that such devices can also be utilized for the purification of waste air, by passing the latter through the device filled with aqueous suspension of immobilized product.

Wastewaters that can be advantageously purified with the aid of the process of this invention are, for example, those wastewaters containing, as the biodegradable compound, aliphatic hydrocarbons optionally with halogen atoms, hydroxy groups, amino groups, oxo groups, nitro groups, nitrile groups, sulfonate groups, sulfate groups, or phosphonate groups interrupted by oxygen atoms or nitrogen atoms.

These optionally substituted hydrocarbons can be saturated or unsaturated, aliphatic or cycloaliphatic.

A group of these optionally substituted hydrocarbons are alkanes, alkenes or cycloalkanes of maximally 8 carbon atoms substituted by halogen atoms, hydroxy groups, amino groups, oxo groups, nitro groups, or nitrile groups and/or interrupted by oxygen atoms or nitrogen atoms.

This group includes, for example, the halogenated hydrocarbons of the general formula

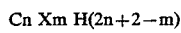

$$C_n X_m H_{(2n+2-m)}$$

wherein
X is a halogen atom (preferably a bromine atom, an iodine atom, or especially a chlorine atom),
n is the number 1 or 2, and
m is the numbers 1 through 4.

It is known that such halogenated hydrocarbons, e.g. methyl bromide, methyl iodide, trichloromethane, tetrachloromethane, 1,1-dichloroethane, 1,2-dichloroethane, 1,1,2-trichloroethane, and 1,1,2,2-tetrachloroethane can be biodegraded with the aid of microorganisms (Appl. Environ. Microbiol., 40:1225 et seq., 1980; 47:825 et seq., 1984; and 49:673 et seq., 1985; Arch. Microbiol., 130:366 et seq., 1981; Conservation and Recycling, 8:91 et seq., 1985).

As own tests have demonstrated, immobilized microorganism products prepared with calcium alginate are less suited for the microbiological degradation of such halogenated hydrocarbons since the evolving hydrogen halides have a disturbing effect.

This group furthermore includes the alkanes or cycloalkanes of maximally 6 carbon atoms mono- or di-substituted by hydroxy groups, amino groups, or oxo groups and/or interrupted by one or two oxygen atoms or nitrogen atoms. These are, for example, alcohols, such as methanol, ethanol, propanol, isopropanol, butanol or glycol, aldehydes, such as formaldehyde or acetaldehyde, ketones, such as acetone, methyl ethyl ketone or methyl isobutyl ketone, acids, such as formic acid, acetic acid, propionic acid or butyric acid, ethers, such as diethyl ether, diisopropyl ether, 1,2-dimethoxyethane, tetrahydrofuran or dioxane, esters, such as methyl acetate, ethyl acetate, butyl acetate or ethyl butyrate, aliphatic amines, such as methylamine, dimethylamine, trimethylamine, diisopropylamine, or aliphatic amides, such as acetamide, N-methylacetamide or dimethylformamide. The fact that such compounds are biodegradable has been mentioned above and has also been described, inter alia, in the following publications: U.S. Pat. Nos. 3,764,476; 3,755,082; Conservation and Recycling 8:91 et seq., 1985; Appl. Environ. Microbiol. 31:900 et seq., 1976; J. Bact. 1972:513.

Compounds of this group worth mentioning are also alkene derivatives, such as acrylic acid, acrylonitrile, methacrylic acid methyl ester, vinyl chloride, propylene, isobutylene, vinyl acetate, etc., which can likewise be biodegraded, as mentioned in the foregoing.

Another group of hydrocarbons worth mentioning is represented by mixtures of unsubstituted alkanes of maximally 16 carbon atoms, as they occur, for example, in gasoline. The fact that these mixtures are biodegradable has been known, inter alia, from U.S. Pat. Nos. 3,873,424 and 3,691,012.

Another group of optionally substituted hydrocarbons that can likewise be mentioned includes the fatty alcohols, fatty acids, alkyl sulfonates or alkyl sulfates of 6-18 carbon atoms, utilized as emulsifiers; these can likewise be biodegraded, as indicated hereinabove.

It is obvious to one skilled in the art that the process of this invention can also be employed for the purification of wastewaters containing aliphatic surfactants (alkyl sulfonates, alkyl sulfates, etc.), fungicides, pesticides, dyes, or polymeric materials (e.g. carbohydrates, proteins, polyethylene glycols, polypropylene glycols), but thus far no experiments have been conducted with these substances within the scope of the present application.

The following practical examples serve to explain the process of this invention in greater detail. The process conditions described in the individual examples are not optimized; the microorganisms utilized in the examples are deposited in public culture collections and freely available to those skilled in the art.

EXAMPLE 1

(a) A 2-liter Erlenmeyer flask with 500 ml of a sterile nutrient solution containing 0.68 g of potassium dihydrogen phosphate, 1.075 g of disodium hydrogen phosphate, 0.25 g of ammonium sulfate, 0.1 g of magnesium sulfate heptahydrate, 5 ml of an aqueous solution of trace elements (the latter containing, per liter, 530 mg of calcium chloride, 200 mg of iron(II) sulfate heptahydrate, 20 mg of manganese(II) sulfate pentahydrate, 40 mg of copper(II) sulfate pentahydrate, 20 mg of zinc(II)

sulfate heptahydrate, 3 mg of boric acid, 4 mg of cobalt-(II) chloride, 4 mg of sodium molybdate dihydrate, and 1.0 ml of concentrated sulfuric acid), and 0.5 g of dichloromethane—adjusted to pH 6.9 —is inoculated with a lyophilized culture of Pseudomonas spec. DM1 (NCIB 11673), sealed, and shaken on a rotary shaker at 145 rpm at 30° C. for 72 hours.

Twelve 2-liter Erlenmeyer flasks with respectively 500 ml of the same sterile nutrient medium are inoculated with respectively 50 ml of the subculture and incubated in the same way as the subculture for 48 hours.

Then the cultures are combined and separated in a laboratory separator LG 205 (company Westfalia Separator AG, Oelde [Westphalia]) at 10,000 rpm. The centrifuged cell mass is resuspended in sterile tap water in order to remove adhering components of the nutrient medium, and again centrifuged, thus obtaining 4.6 g of a moist Pseudomonas spec. (NCIB 11673) biomass with a content of 11.3% bacterial dry weight.

(b) 1.5 g of K-carrageenan type III (manufacturer: Sigma Chemical Comp., St. Louis, USA) is introduced into 40 ml of tap water and heat-sterilized, the K-carrageenan being dissolved thereby.

The solution is then allowed to cool down to 48° C., combined with a warm suspension of 6 g of moist Pseudomonas spec. (NCIB 11673) biomass having a temperature of 40° C. (prepared according to Example 1a) in 5 ml of a 0.1-molar aqueous phosphate buffer solution, pH 7, the mixture is agitated for 20 seconds, and poured into a sandwich cell, the glass plates of which have a spacing of 3 mm. After allowing the mass to stand for 30 minutes, it is removed, forced through a screen of 3 mm mesh width, and hardened in proportions of respectively 5 g for 16 hours at 8° C. in respectively 50 ml of a 2% aqueous potassium chloride solution. Then the immobilized products are filtered off and resuspended in respectively 50 ml of tap water.

(c) A sealed 1-liter glass fermentor with automatic pH control is filled with 200 ml of tap water, 0.075 ml of dichloromethane (corresponding to 1 g of dichloromethane per liter) and 10 ml of the immobilized product suspension prepared according to Example 1b and, with automatic pH adjustment to 7.2, stirred for 90 minutes at 145 rpm at 30° C. After this time period, the dichloromethane in the reaction mixture has been practically entirely degraded.

After filtration, the recovered immobilized product can be reused and shows no loss of activity.

EXAMPLE 2

A 500-milliliter Erlenmeyer flask is charged with 100 ml of tap water, 0.1 ml of a 40% aqueous formaldehyde solution (corresponding to 0.4 g of formaldehyde per liter) and 10 ml of the suspension of immobilized product prepared in accordance with Example 1b, sealed, and shaken for 60 minutes at 30° C. with 145 rpm. After this time, the formaldehyde has been practically entirely degraded.

After filtration, the recovered immobilized product can be reused and shows no loss of activity.

EXAMPLE 3

A sealed 1-liter glass fermentor with automatic pH control is filed with 500 ml of tap water, 0.045 ml of 1-chloro-2-propanone (corresponding to 0.5 g of 1-chloro-2-propanone per liter) and 10 ml of the suspension immobilized product prepared according to Example 1b, and, under automatic pH value adjustment to 7.2, stirred for 90 minutes with 145 rpm at 30° C. After this time period, the 1-chloro-2-propanone has been practically completely degraded.

EXAMPLE 4

A 500-milliliter Erlenmeyer flask is filled with 100 ml of tap water, 0.4 ml of methanol (corresponding to 3.2 g of methanol per liter) and 10 ml of the suspension of immobilized product produced according to Example 1b, sealed, and shaken for 120 minutes at 30° C. with 145 rpm. After this time, the methanol has been practically entirely degraded.

After filtration, the recovered immobilized product can be reused and shows no loss of activity.

EXAMPLE 5

Two grams of the thus-obtained, moist Pseudomonas spec. (NCIB 11673) biomass (corresponding to 0.2 g of bacterial dry weight) is homogenized in a sterilized sodium alginate solution (prepared by homogenization of 800 mg of "Texamid" 558 by Henkel GmbH, D-4000 Duesseldorf, and 40 ml of tap water).

By means of an elastic tube pump, this homogenate is added dropwise through a silicone rubber hose, the end of which is pointed, under agitation into 500 ml of a sterilized 0.1-molar aqueous calcium chloride solution (produced from calcium chloride dihydrate and tap water).

The mixture is stirred for another hour, the resultant immobilized product is filtered off and washed with tap water.

The thus-produced Pseudomonas spec. (NCIB 11673) immobilized product suspensions can be utilized for the purification of methanol-containing wastewater under the conditions described in Example 4.

EXAMPLE 6

Two grams of moist Pseudomonas spec. (NCIB 11673) biomass (prepared according to Example 1a) is suspended in 20 ml of an ice-cooled 0.1-molar aqueous tris(hydroxymethyl)aminomethane buffer, pH 7.5.

In parallel thereto, 7.2 g of acrylamide and 0.4 g of N,N'methylenebisacrylamide are dissolved in water and diluted under ice cooling with water to 25 ml.

Subsequently, both solutions are combined, mixed with 2.5 ml of a 10% aqueous solution of N,N,N',N'-tetramethylethylenediamine and 0.5 ml of a 5% aqueous potassium persulfate solution, and the mixture is poured into a sandwich cell with a plate distance of 3 mm. The mixture is purged 2 minutes with nitrogen and cooled for 6 minutes in an ice bath. Then the mixture is allowed to stand at room temperature for one hour, the gel is pressed through a screen of 2 mm mesh width, the resultant pellets are washed three times with respectively 250 ml of 0.05-molar tris(hydroxymethyl)aminomethane buffer, pH 7.5, and stored herein at 4° C.

The thus-produced immobilized Pseudomonas spec. (NCIB 11673) suspensions can be utilized under the conditions disclosed in Example 1c for the purification of water containing dichloromethane.

EXAMPLE 7

400 mg of sodium K-carrageenan, Type III (manufacturer: Sigma Chemical Comp., St. Louis, USA) is dissolved in 10 ml of tap water, and homogenized with 5 g of silica gel (manufacturer: Merck AG, Darmstadt, FRG) and 1.0 g of moist Pseudomonas spec. (NCIB 11673) biomass prepared according to Example 1b.

By means of an elastic tube pump, this homogenate is introduced dropwise through a silicone rubber hose, the end of which is pointed, under agitation into 500 ml of a sterilized 0.1-molar aqueous potassium chloride solution.

The mixture is stirred for another hour, the resultant immobilized product is filtered off and washed with tap water.

The thus-produced immobilized Pseudomonas spec. (NCIB 11673) suspensions can be utilized under the conditions described in Example 1c for the purification of water which contains dichloromethane.

EXAMPLE 8

(a) A 2-liter Erlenmeyer flask with 500 ml of a sterile nutrient solution containing 0.38 g of potassium dihydrogen phosphate, 0.51 g of dipotassium hydrogen phosphate, 0.05 g of sodium chloride, 0.1 g of magnesium sulfate heptahydrate, 5 ml of an aqueous solution of trace elements (containing per liter 530 mg of calcium chloride, 200 mg of iron(II) sulfate heptahydrate, 20 mg of manganese(II) sulfate pentahydrate, 40 mg of copper(II) sulfate pentahydrate, 20 mg of zinc(II) sulfate heptahydrate, 3 mg of boric acid, 4 mg of cobalt(II) chloride, 4 mg of sodium molybdate dihydrate, and 1.0 ml of concentrated sulfuric acid) and 5.0 ml of acetonitrile—adjusted to pH 7.3 —is inoculated with a lyophilized culture of Rhodococcus rhodochorus (ATCC 33278), sealed, and shaken on a rotary shaker with 145 rpm at 30° C. for 48 hours.

Twelve 2-liter Erlenmeyer flasks with respectively 500 ml of the same sterile nutrient medium are inoculated with respectively 50 ml of the subculture and incubated in the same way as the subculture for 48 hours.

The cultures are then combined and separated in a laboratory separator LG 205 (company: Westfalia Separator AG, Oelde [Westphalia]) at 10,000 rpm. The centrifuged cell mass is washed with distilled water to remove adhering components of the nutrient medium and again centrifuged, thus obtaining 6.3 g of a moist Rhodococcus rhodochorus (ATCC 33278) biomass containing 12% bacterial dry weight.

(b) Two grams of the thus-produced moist Rhodococcus rhodochorus (ATCC 33278) biomass is homogenized with 200 mg of a sterilized sodium alginate solution (prepared by homogenizing 800 mg of "Texamid" 558 by Henkel GmbH, D-4000 Duesseldorf, with 40 ml of water). By means of an elastic tube pump, this homogenate is added dropwise through a silicone rubber hose, the end of which is fashioned as a pointed tip, under agitation into 500 ml of a sterilized 0.1-molar aqueous calcium chloride solution (produced from calcium chloride dihydrate and tap water).

The mixture is stirred for another hour, the resultant immobilized preparation is filtered off and washed with tap water.

(c) A 500 ml Erlenmeyer flask is filled with 100 ml of tap water, 0.5 ml of acetonitrile and 10 ml of the immobilized preparation produced in accordance with Example 8b, sealed, and shaken at a pH of 7.2 for 180 minutes at 145 rpm at 30° C. After this time, the acetonitrile in the reaction mixture has been practically entirely degraded.

After filtration, the recovered immobilized product can be reused and shows no loss of activity.

EXAMPLE 9

A 500 ml Erlenmeyer flask is charged with 100 ml of tap water, 0.4 g of acetamide and 10 g of the immobilized product prepared according to Example 8b, sealed, and shaken with 145 rpm for 120 minutes at 30° C. After this time, the acetamide has been degraded practically entirely.

After filtration, the recovered immobilized product can be reused and shows no loss of activity.

EXAMPLE 10

(a) A 2-liter Erlenmeyer flask with 500 ml of a sterile nutrient solution containing 0.38 g of potassium dihydrogen phosphate, 0.51 g of dipotassium hydrogen phosphate, 0.05 g of sodium chloride, 0.1 g of magnesium sulfate heptahydrate, 5 ml of an aqueous solution of trace elements (this solution containing, per liter, 530 mg of calcium chloride, 200 mg of iron(II) sulfate heptahydrate, 20 mg of manganese(II) sulfate pentahydrate, 40 mg of copper(II) sulfate pentahydrate, 20 mg of zinc(II) sulfate heptahydrate, 3 mg of boric acid, 4 mg of cobalt(II) chloride, 4 mg of sodium molybdate dihydrate, and 1.0 ml of concentrated sulfuric acid)—adjusted to pH 7.2 —is inoculated with a lyophilized culture of Rhodococcus spec. (ATCC 29691), sealed, and shaken while introducing gaseous propane on a rotary shaker with 145 rpm at 30° C. for 72 hours.

Twelve 2-liter Erlenmeyer flasks with respectively 500 ml of the same sterile nutrient medium are inoculated with respectively 50 ml of the subculture and incubated for 72 hours in the same way as the subculture.

Subsequently, the cultures are combined and separated in a laboratory separator LG 205 (company: Westfalia Separator AG, Oelde [Westphalia]) at 10,000 rpm. The centrifuged cell mass is washed with distilled water to remove adhering components of the nutrient medium and again centrifuged, thus obtaining 5.8 g of a moist Rhodococcus spec. (ATCC 29671) biomass containing 12% bacterial dry weight.

(b) Two grams of the thus-produced moist Rhodococcus spec. (ATCC 29671) biomass is homogenized with 200 mg of a sterilized sodium alginate solution (prepared by homogenization of 800 mg of "Texamid" 558 by Henkel GmbH, D-4000 Duesseldorf, with 40 ml of water). By means of an elastic tube pump, this homogenate is added dropwise through a silicone rubber hose, the end of which is fashioned as a point, under agitation into 500 ml of a sterilized 0.1-molar aqueous calcium chloride solution (prepared from calcium chloride dihydrate and tap water).

The mixture is stirred for another hour, the resultant immobilized product is filtered off and washed with tap water.

A 500 ml Erlenmeyer flask is filled with 100 ml of tap water, 0.2 ml of 1,2-propanediol and 10 g of the immobilized preparation produced according to Example 10b, sealed, and shaken with 145 rpm at 30° C. for 120 minutes. After this time, the 1,2-propanediol in the reaction mixture has been practically completely degraded.

EXAMPLE 11

A 500 ml Erlenmeyer flask is filled with 100 ml of tap water, 0.01 ml of propylamine and 10 g of the immobilized preparation produced according to Example 10b, sealed, and shaken with 145 rpm at 30° C. for 60 minutes. After this time, the propylamine is practically completely degraded.

After filtration, the recovered immobilized product can be reused and shows no loss of activity.

EXAMPLE 12

A 500 ml Erlenmeyer flask is charged with 100 ml of tap water, 0.2 ml of acetone and 10 g of the immobilized preparation made according to Example 10b, sealed, and shaken with 145 rpm at 30° C. for 60 minutes. After this time, the acetone has been practically entirely degraded.

We claim:

1. A process for the purification of wastewater containing a biodegradable aliphatic compound of the general formula $$C_n X_m H_{(2n+2-m)}$$

wherein
X is a halogen atom
n is 1 or 2, and
m is 1–4,
comprising contacting said wastewater with a microorganism capable of biodegradation of said compounds, said microorganism having been immobilized by embedding it in a gel-type organic polymer which does not denature the microorganism and which is a carrageenan polymer, a polyacrylamide and/or a polymethacrylamide.

2. A process for the purification of wastewater according to claim 1, wherein immobilized products of aerobic microorganisms are utilized.

3. A process for the purification of wastewater according to claim 1, conducted at the site of origination of the wastewater.

* * * * *